United States Patent
Oh et al.

(10) Patent No.: US 11,532,805 B2
(45) Date of Patent: Dec. 20, 2022

(54) METHOD OF PREPARING ELECTRODE FOR SECONDARY BATTERY

(71) Applicant: LG Chem, Ltd., Seoul (KR)

(72) Inventors: Sei Woon Oh, Daejeon (KR);
Minkyung Kim, Daejeon (KR); Yeo Kyung Yoon, Daejeon (KR); Sun Hwak Woo, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/283,784

(22) PCT Filed: Jan. 20, 2020

(86) PCT No.: PCT/KR2020/000940
§ 371 (c)(1),
(2) Date: Apr. 8, 2021

(87) PCT Pub. No.: WO2020/171391
PCT Pub. Date: Aug. 27, 2020

(65) Prior Publication Data
US 2021/0391565 A1    Dec. 16, 2021

(30) Foreign Application Priority Data

Feb. 21, 2019  (KR) .................. 10-2019-0020504

(51) Int. Cl.
*H01M 4/04* (2006.01)
*B05D 1/26* (2006.01)
(Continued)

(52) U.S. Cl.
CPC ....... *H01M 4/0404* (2013.01); *H01M 4/0435* (2013.01); *B05D 1/26* (2013.01);
(Continued)

(58) Field of Classification Search
CPC .. H01M 4/0404; H01M 4/0435; H01M 4/139; H01M 4/525; H01M 10/052; H01M 10/04; B05D 1/26; B05D 1/265
(Continued)

(56) References Cited

U.S. PATENT DOCUMENTS 7,700,019 B2 *  4/2010  Lavoie ................ H01M 4/0483
                                                      429/231.95
8,425,984 B2   4/2013  Oki et al.
(Continued)

FOREIGN PATENT DOCUMENTS

JP    2007035589 A    2/2007
JP    2009525568 A    7/2009
(Continued)

OTHER PUBLICATIONS

International Search Report for Application No. PCT/KR2020/000940 dated May 1, 2020, pp. 1-3.
(Continued)

*Primary Examiner* — Brian K Talbot
(74) *Attorney, Agent, or Firm* — Lerner, David, Littenberg, Krumholz & Mentlik, LLP

(57) ABSTRACT

SUMMARY
A method of preparing an electrode for a secondary battery according to an embodiment of the present disclosure includes the steps of: injecting a first slurry prepared by dissolving a first active material in a first solvent and a second slurry prepared by dissolving a second active material in a second solvent into a single coating device; and coating the first slurry and the second slurry onto a current collector through the single coating device, wherein the first solvent and the second solvent have different physical properties, and form a layered structure of a first layer
(Continued)

including the first slurry and a second layer including the second slurry on the current collector, respectively.

11 Claims, 1 Drawing Sheet

(51) Int. Cl.
   *H01M 4/525* (2010.01)
   *H01M 10/052* (2010.01)
   *H01M 10/04* (2006.01)
   *H01M 4/139* (2010.01)

(52) U.S. Cl.
   CPC ............ *B05D 1/265* (2013.01); *H01M 4/139* (2013.01); *H01M 4/525* (2013.01); *H01M 10/04* (2013.01); *H01M 10/052* (2013.01)

(58) Field of Classification Search
   USPC .................................. 427/58, 115; 429/209
   See application file for complete search history.

(56) References Cited

U.S. PATENT DOCUMENTS

| | | | |
|---|---|---|---|
| 8,435,671 | B2 | 5/2013 | Zaghib et al. |
| 9,034,490 | B2 | 5/2015 | Zaghib et al. |
| 2005/0266305 | A1* | 12/2005 | Ohata .................. H01M 50/411 429/144 |
| 2007/0026312 | A1* | 2/2007 | Imachi ................ H01M 4/5825 429/217 |
| 2007/0126331 | A1 | 6/2007 | Kim et al. |
| 2008/0299457 | A1* | 12/2008 | Muraoka ............... H01M 4/661 429/217 |
| 2010/0304221 | A1 | 12/2010 | Zhang et al. |
| 2011/0159372 | A1* | 6/2011 | Zhamu .................. H01M 4/139 429/232 |
| 2012/0308662 | A1 | 12/2012 | Konishi et al. |
| 2018/0006291 | A1 | 1/2018 | Kim et al. |
| 2018/0277896 | A1* | 9/2018 | Yoshima ............. H01M 50/581 |
| 2019/0374971 | A1* | 12/2019 | Horinouchi ........... B05C 5/0254 |
| 2020/0266418 | A1* | 8/2020 | Yao ..................... H01M 4/0404 |
| 2021/0399308 | A1* | 12/2021 | Kim ....................... H01M 4/525 |
| 2022/0016665 | A1* | 1/2022 | Lee ......................... B05C 11/10 |

FOREIGN PATENT DOCUMENTS

| | | |
|---|---|---|
| JP | 2009198545 A | 9/2009 |
| JP | 2011210478 A | 10/2011 |
| JP | 5454295 B2 | 3/2014 |
| KR | 20070015039 A | 2/2007 |
| KR | 100730044 B1 | 6/2007 |
| KR | 20080091499 A | 10/2008 |
| KR | 20120135063 A | 12/2012 |
| KR | 20150042424 A | 4/2015 |
| KR | 20150045786 A | 4/2015 |
| KR | 20160026743 A | 3/2016 |
| KR | 20160111673 A | 9/2016 |
| KR | 20190012869 A | 2/2019 |
| WO | 2013088824 A1 | 6/2013 |

OTHER PUBLICATIONS

Search Report for European Patent Application No. 20759693.3 dated Dec. 3, 2021. 2 pgs.

* cited by examiner

[FIG. 1]
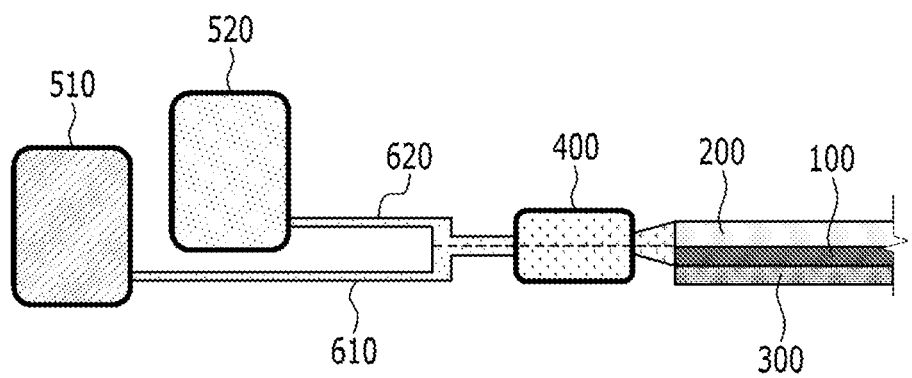
[FIG. 2]
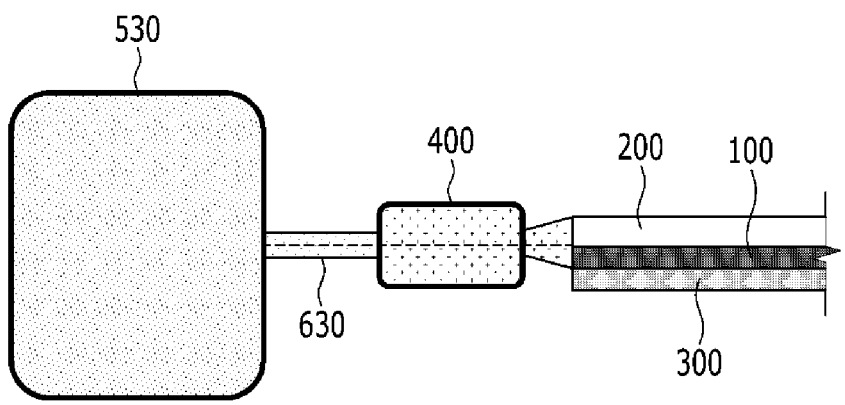

METHOD OF PREPARING ELECTRODE FOR SECONDARY BATTERY

CROSS-REFERENCE TO RELATED APPLICATIONS

The present application is a national phase entry under 35 U.S.C. § 371 of International Application No. PCT/KR2020/000940, filed on Jan. 20, 2020, which claims priority to Korean Patent Application No. 10-2019-0020504, filed on Feb. 21, 2019, the disclosures of which are incorporated herein by reference in their entirety.

TECHNICAL FIELD

The present disclosure relates to a method of preparing an electrode for a secondary battery, and more particularly, to a method of preparing an electrode for a secondary battery that can more easily and efficiently prepare an electrode having a multi-layered structure.

BACKGROUND ART

Along with the increase of the technological development and demand for a mobile device, demand for secondary batteries which are rechargeable and can be small-sized and large-sized rapidly increases. In addition, among secondary batteries, lithium secondary batteries having high energy density and voltage have been commercialized and widely used.

A lithium secondary battery has a structure in which an electrode assembly, in which a porous separator is interposed between electrodes, that is, a positive electrode and a negative electrode, each of which includes an active material coated on a current collector, is impregnated with a lithium salt-containing electrolyte. The electrode is prepared by passing through a mixing step of mixing/dispersing an active material, a binder and a conductive material in a solvent to prepare a slurry, a coating process of coating and drying the slurry onto a current collector in the form of a thin film, and a pressing step of increasing the capacity density of the electrode after the coating step and increase adhesion between the current collector and the active material, thereby forming an electrode-coating layer on a current collector.

Recently, attempts have been made to coat active material layers of mutually different materials as electrodes of a multi-layered structure, or to coat even the active material layer of the same material by changing the size and density of the particles.

For example, the electrode mixture portion in contact with the current collector needs to transfer electrons to the active material farther away from the current collector, and so it is required to have high electron conductivity, whereas the electrode mixture portion far from the current collector is required to have excellent impregnation property of an electrolyte and ionic conductivity with the electrolyte, and should be advantageous in discharging gas that may occur during the charge/discharge process. The above-mentioned problem can be solved through electrodes having a multi-layered structure in which the sizes of particles constituting the active material is different for each layer. In addition, in order to increase the capacity and density of the secondary battery, the electrode can be composed of two active material layers. For example, an electrode has been proposed in which one active material layer is a high power layer so that a fast movement speed of lithium ions can be secured, and another active material layer is formed into a high energy layer to ensure a high energy density.

In the preparation of the electrode with a multi-layered structure as above, conventionally, a method in which a first slurry is coated onto an electrode current collector followed by drying and rolling to form a first active material layer, and a second slurry is coated onto the first active material layer followed by drying and rolling to form a second active material layer was used.

However, in the case of the conventional method, the procedure of moving the electrode current collector including the active material layer along the process line during these steps, or winding for the convenience of storage, or unwinding from the winding to be put into the process is repeated, and in that procedure, there has been a problem that the first active material layer coated and dried onto the electrode current collector or the second active material layer coated and dried onto the first active material layer is detached.

Further, each time each layer is formed, the coating, drying, and rolling processes have to be repeated, and thus a complicated process is required. As the number of layers required becomes larger, the manufacturing process is more complicated.

Further, an intermixing phenomenon in which constituent materials of slurries having an alignment error or flowability that may occur when forming a multi-layered structure are mixed with each other through an interlayer interface has become a problem.

Therefore, there is a need to develop a technology capable of fundamentally solving the above-mentioned problems.

DETAILED DESCRIPTION OF THE INVENTION

Technical Problem

The problem to be solved by the embodiments of the present disclosure is directed to solve the above-mentioned problems, and an object thereof is to provide a method of preparing an electrode for a secondary battery that can easily and efficiently prepare an electrode having a multi-layered structure without a complicated process, while preventing an alignment error between layers or an intermixing phenomenon that may occur during the preparing process.

Technical Solution

According to one embodiment of the present disclosure, there is provided a method of preparing an electrode for a secondary battery comprising the steps of:
  injecting a first slurry prepared by dissolving a first active material in a first solvent and a second slurry prepared by dissolving a second active material in a second solvent into a single coating device; and
  coating the first slurry and the second slurry onto a current collector through the single coating device,
  wherein the first solvent and the second solvent have mutually different physical properties, and form a layered structure of a first layer including the first slurry and a second layer including the second slurry on the current collector, respectively.

The first solvent may be a polar solvent, and the second solvent may be a non-polar solvent.

The first active material may be polar, and the second active material may be non-polar.

The first solvent may include water, and the second solvent may include at least one selected among propanol, pentanol, butanol, hexanol, ethylene glycol, propylene glycol, diethylene glycol and glycerol.

The first slurry and the second slurry may be simultaneously coated onto the current collector in a state of being not mixed with each other in the single coating device.

The stacking order of the first layer and the second layer may be determined by a difference in density between the first slurry and the second slurry.

The first slurry and the second slurry are discharged through a coating port in the single coating device, and then coated onto the current collector.

A boundary between the first slurry and the second slurry in the single coating device may be located inside the coating port.

The first slurry and the second slurry may be respectively injected into the single coating device from separate mixers.

The flow rates per unit time at which the first slurry and the second slurry are injected into the single coating device from the separate mixers may be identical to each other.

The first slurry and the second slurry may be injected together into to a single coating device through a single pipe from a single mixer.

A boundary between the first slurry and the second slurry may be located inside the single pipe.

The method may include a drying step of simultaneously drying the first layer and the second layer coated onto the current collector.

The method may include a rolling step of simultaneously rolling the first layer and the second layer coated onto the current collector to form a first active material layer and a second active material layer.

Advantageous Effects

According to the embodiment of the present disclosure, since a plurality of active material layers are formed by using solvents that are not mixed with each other and can form a layered structure due to the difference in polarity, it is not necessary to repeatedly perform steps such as coating, drying, and rolling, whereby the preparation process can be simplified, the alignment error of each layer can be minimized, and the intermixing phenomenon at an interface between layers can be prevented.

BRIEF DESCRIPTION OF THE DRAWINGS

FIG. 1 is a view for explaining a method of preparing an electrode for a secondary battery according to an embodiment of the present disclosure.

FIG. 2 is a view for explaining a method of preparing an electrode for a secondary battery according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it, can further include other components, without excluding the other components, unless otherwise stated.

FIG. 1 is a view for explaining a method of preparing an electrode for a secondary battery according to an embodiment of the present disclosure.

Referring to FIG. 1, the method of preparing an electrode for a secondary battery according to an embodiment of the present disclosure includes a step of injecting a first slurry and a second slurry in a second solvent into a single coating device 100.

The first slurry can be prepared by dissolving a first active material together with a binder and a conductive material in a first solvent, thereby mixing and dispersing them in the first solvent.

The second slurry can be prepared by dissolving a second active material together with a binder and a conductive material in a second solvent, thereby mixing and dispersing them in the second solvent.

The first solvent and the second solvent are preferably separated from each other without being mixed with each other in a single coating device 400. For this purpose, it is preferable that the first solvent and the second solvent have mutually different physical properties.

Specifically, the first solvent may be a polar solvent, and the second solvent may be a non-polar solvent. Thus, the first active material dissolved in the first solvent is polar, and the second active material dissolved in the second solvent may be non-polar. The non-polar active material mainly consists of a positive electrode active material containing lithium, and specific materials thereof will be described later.

The non-polar solvent preferably includes at least one selected among propanol, pentanol, butanol, hexanol, ethylene glycol, propylene glycol, diethylene glycol and glycerol, and the polar solvent preferably includes water.

Therefore, the first slurry and the second slurry may not be mixed even in the single coating device 400.

Referring back to FIG. 1, subsequently, a step of coating the first and the second slurry onto a current collector 300 through the single coating device 400 is performed. Specifically, the first slurry and the second slurry are coated simultaneously onto the current collector 300 from a single coating device 400, and more specifically, the first slurry and the second slurry are discharged through one coating port from a single coating device 400 and then coated onto the current collector 300. Thereby, the layered structure of a first layer 100 containing the first slurry and a second layer 200) containing the second slurry can be formed.

Conventionally, in order to prepare an electrode having a multi-layered structure, a method including a step of coating a first slurry onto an electrode current collector, followed by drying and then rolling to form a first active material layer, and a step of coating a second slurry onto the first active material layer, followed by drying and rolling to form a second active material layer has been used. Further, a method of coating the first slurry and the second by two coating ports, respectively, followed by drying and rolling simultaneously to produce an electrode having a multi-layered structure has been used.

On the other hand, in the method of preparing the electrode for a secondary battery according to the present embodiment, the first slurry and the second slurry form a layered structure without being mixed with each other in the same storage tank, and can be located in a single coating device 400. Thus, even if the first slurry and the second slurry are simultaneously coated through the single coating device 400, the layered structure of the first layer 100 and the second layer 200 may be formed on the current collector 300.

That is, since the first slurry and the second slurry can be coated simultaneously, an alignment error between the first layer 100 containing the first slurry and the second layer 200 containing the second slurry can be significantly reduced, and the complicated process required for preparing multi-layered electrodes can be simplified.

In addition, before the drying step, an intermixing phenomenon in which constituent materials of slurries having flowability are mixed with each other beyond a boundary through an interface between layers may become a problem. However, in the present embodiment, the intermixing phenomenon at the interface between the first layer 100 and the second layer 200 can be effectively prevented due to the difference in polarity between the first slurry and the second slurry.

Since it is not necessary to prepare devices such as a coating port for coating differently, it is possible to save time and cost in the process.

Further, the stacking order of the layered structures in which the first layer 100 containing the first slurry and the second layer 200 containing the second slurry are formed may be determined by a difference in density between the first slurry and the second slurry. For example, depending on the density difference, a polar solvent may be located at the bottom, and a non-polar solvent may be located at the top. Conversely, a polar solvent may be located at the top, and a non-polar solvent may be located at the bottom.

In FIG. 1, a method of preparing an electrode having a two-layer structure in which the first layer 100 and the second layer 200 are formed is illustrated for convenience of description, but it is needless to say that two or more electrodes of multi-layered structures may be prepared according to the same principle, if necessary. In particular, as the number of layers increases, the conventional method needs to perform coating, drying, and rolling every time, or requires a coating injection nozzle depending on the number of slurries, which makes the process complicated and needs more time and cost. On the other hand, the method of preparing an electrode according to the present embodiment can provide an electrode having a multi-layered structure in which the boundaries are divided in a much simpler and efficient manner.

The first active material constituting the first slurry and the second active material constituting the second slurry may be the material identical to or different from each other depending on the required multi-layered electrode.

For example, in order to set the electron conductivity, the electrolyte impregnation property, and the ionic conductivity of electrolyte so as to be different for parts close to and far from the current collector in the active material layer, the first active material and the second active material are composed of the same material, but the size of the active material particles and the content of the conductive material may be set so as to be different.

As another example, the concentrations of the first active material and the second active material may be configured to be different, and the first active material and the second active material may be composed of different materials.

Meanwhile, in order to simultaneously coat the first slurry and the second slurry onto the current collector 300 from the single coating device 400, it is preferable that the boundary between the first slurry and the second slurry is located inside the coating port of the single coating device 400. This will be described in detail below with reference to FIGS. 1 and 2.

Further, since the concentration and viscosity of the first slurry and the second slurry for forming the active material layer are not low, the layered structure should be formed without being mixed in the single coating device 400, and by injecting the first slurry and the second slurry at the same pressure through the single coating device 400, the first slurry and the second slurry are preferably coated onto the current collector 300 while maintaining the state of the layered structure.

Further, for an application thereto, by finely adjusting the boundary between the first slurry and the second slurry in the coating port, the thickness of the coated first layer 100 and second layer 200 can be set so as to be different from each other.

Referring back to FIG. 1, in the method of preparing an electrode for a secondary battery according to an embodiment of the present disclosure, the first slurry and the second slurry may be injected into the single coating device 400 from separate mixers 510 and 520, respectively.

As mentioned above, the first slurry is prepared by mixing and dispersing the first active material together with a binder and a conductive material in a first solvent and the second slurry is prepared by mixing and dispersing the second active material together with a binder and a conductive material in a second solvent.

Each of the first slurry and the second slurry may be prepared through stirring in the first mixer 510 and the second mixer 520, and furthermore, storage can be achieved. At this time, in order to prevent the slurry from solidifying, stirring may be performed even during storage.

Alternatively, after the first slurry and the second slurry are prepared in separate devices, and then only storage may be performed in the first mixer 510 and the second mixer 520, respectively.

The first slurry and the second slurry are respectively injected into the single coating device 400 via a first pipe 610 and a second pipe 620 from the first mixer 510 and the second mixer 520, and at this time, the flow rate per unit time is preferably identical to each other. Otherwise, the boundary between the first slurry and the second slurry cannot be located inside the coating port in the single coating device 400, and the first slurry and the second slurry may not be coated simultaneously.

That is, the dotted line in FIG. 1 means a boundary between the first slurry and the second slurry in the single coating device 400. By setting the flow rate per hour of the first slurry flowing through the first pipe 610 and the second slurry flowing through the second pipe 620 so as to be identical, a boundary (represented by a dotted line) between the first slurry and the second slurry may be located inside the coating port of the single coating device 400.

FIG. 2 is a view for explaining a method of preparing an electrode for a secondary battery according to another embodiment of the present disclosure.

In FIG. 2, simultaneously coating the first slurry and the second slurry onto the current collector 300 through the single coating device 400 is overlapping matter with the contents described above, and so it will be omitted.

Referring to FIG. 2, in a method of preparing an electrode for a secondary battery according to another embodiment of the present disclosure, a first slurry and a second slurry may be injected into a single coating device 400 from a single mixer 530.

The prepared first slurry and second slurry may be stored together in a single mixer 530. Similarly, in order to prevent the slurry from solidifying, stirring may be performed even during storage.

When the first shiny and the second slurry are injected into a single coating device 400 via a single pipe 630 from a single mixer 530, it is preferable that a boundary, between the first slurry and the second slurry is located inside the single pipe 630. Otherwise, the flow rates of the first slurry and the second slurry flowing through the single pipe 630 are not identical and thus, the boundary between the first slurry and the second slurry cannot be located inside the coating port in the single coating device 400.

That is, the dotted line in FIG. 2 means a boundary between the first slurry and the second slurry in the single coating device 400. In order to set the flow rates of the first slurry and the second slurry so as to be identical, a boundary (represented by a dotted line between the first slurry and the second slurry must be located inside the single pipe 630.

Subsequently, a step of drying the first layer 100 and the second layer 200 coated onto the current collector 300 may be performed. As mentioned above, since the first slurry and the second slurry are coated together onto the current collector 300 to form the first layer 100 and the second layer 200, drying can be performed at the same time.

Further, a rolling step of simultaneously rolling the dried first layer 100 and the second layer 200 to increase the capacity density of the electrode and increase the adhesion between the current collector 300 and the active material may be continued.

Since the drying step can be performed at the same time, the preparation process for preparing the electrode having the multi-layered structure can be simplified more efficiently, wasted time and money can be saved, and the extent of drying of each of the multilayer structures can be effectively adjusted.

Meanwhile, the electrode for a secondary battery prepared according to the present embodiments includes a positive electrode and a negative electrode.

The positive electrode is prepared, for example, by coating and then drying a mixture of a positive electrode active material, a conductive material, and a binder onto a positive electrode current collector and/or an extension current collector, and if necessary, the mixture may further a filler.

In general, the positive electrode current collector and/or the extension current collector may be formed to a thickness of 3 to 500 micrometers. The positive electrode current collector and the extension current collector are not particularly limited as long as a corresponding battery has high conductivity while a chemical change is not caused in the battery, and for example, may be formed of stainless steel, aluminum, nickel, titanium, baked carbon, or aluminum, or a material formed by surface-treating a surface of stainless steel with carbon, nickel, titanium, silver, or the like. The positive electrode current collector and the extension current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The positive electrode active material may be a layered compound such as lithium cobalt oxide ($LiCoO_2$) or lithium nickel oxide ($LiNiO_2$) or a compound substituted with one or more transition metals; lithium manganese oxides such as chemical formulae $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01~0.3); lithium manganese composite oxide represented by chemical formulae $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like, but is not limited thereto.

In general the conductive material is added in an amount of 1 to 30% by weight based on the total weight of the mixture containing the positive electrode active material. The conductive material is not particularly limited as long as a corresponding battery has high conductivity while a chemical change is not caused in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

The binder is a component that facilitates coupling of an active material, a conductive material, and the like, coupling of a current collector, and typically, may be added in an amount of 1 to 30% by weight based on a total weight of the mixture containing the positive electrode active material. An example of the binder may include polyvinylidene fluoride, polyvinyl alcohol, carboxymethyl cellulose (CMC) starch, hydroxypropyl cellulose, regenerated cellulose, polyvinylpyrrolidone, tetrafluoroethylene, polyethylene, polypropylene, ethylene-propylene-diene polymer (EPDM), sulfonated EPDM, styrene styrene rubber, fluorine rubber, and various copolymers.

The filler may be optionally used as a component for suppressing expansion of a positive electrode, and is not particularly limited as long as the filler is a fibrous material while a chemical change is not caused in the battery. For example, (Actinic polymers such as polyethylene and polypropylene, and fibrous materials such as glass fibers and carbon fibers are used.

The negative electrode is produced by coating and drying a negative electrode active material on a negative electrode current collector and/or an extension current collector, and if necessary, may optionally and further include the above-mentioned components.

In general, the negative electrode current collector and/or the extension current collector may be formed to a thickness of 3 to 500 micrometers. The negative electrode current collector and/or the extension current collector are not particularly limited as long as a corresponding battery has high conductivity while a chemical change is not caused in the battery, and for example, may be formed of copper, stainless steel, aluminum, nickel, titanium, or baked carbon, or a material formed by surface-treating g a surface of copper or stainless steel with carbon, nickel, titanium, silver, or the like, or may use an aluminum-cadmium alloy or the like. In addition, similar to the positive electrode current collector, the negative electrode current collector and the extension current collector may have fine protrusions and depressions formed on a surface thereof to enhance adherence of a negative electrode active material, and may be formed in various forms such as a film, a sheet, a foil, a net, a porous body, a foaming body, and a non-woven fabric structure.

An example of the negative electrode active material may include carbons such as hardly graphitizable carbon and graphite-based carbon; metal composite oxides such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me':Al, B, P, Si, Group 1, 2, 3 elements in the periodic table, halogen; $0 < x \leq 1$; $1 \leq y \leq 3$; $1 \leq z \leq 8$); lithium alloys; silicon-based alloys; tin-based alloys; metal-based oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$; a conductive polymer such as polyacetylene; Li—Co—Ni based materials and the like.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: first layer
200: second layer
300: current collector
400: single coating device

The invention claimed is:

1. A method of preparing an electrode for a secondary battery comprising:
   injecting a first slurry prepared by dissolving a first active material in a first solvent and a second slurry prepared by dissolving a second active material in a second solvent into a single coating device; and
   discharging the first slurry and the second slurry through one coating port of a single coating device such that an interface between the first slurry and the second slurry exists in the one coating port, in order to simultaneously coat the first slurry and the second slurry onto a current collector through the one coating port of the single coating device,
   wherein the first solvent and the second solvent have mutually different physical properties, and form a layered structure of a first layer including the first slurry and a second layer including the second slurry on the current collector, respectively.

2. The method of preparing an electrode for a secondary battery according to claim 1,
   wherein the first solvent is a polar solvent, and
   the second solvent is a non-polar solvent.

3. The method of preparing an electrode for a secondary battery according to claim 2,
   wherein the first active material is polar, and the second active material is non-polar.

4. The method of preparing an electrode for a secondary battery according to claim 2,
   wherein the first solvent includes water, and
   the second solvent includes one of propanol, pentanol, butanol, hexanol, ethylene glycol, propylene glycol, diethylene glycol, glycerol, or mixtures thereof.

5. The method of preparing an electrode for a secondary battery according to claim 1,
   wherein when the first slurry and the second slurry are simultaneously coated onto the current collector, they are in a state of being not mixed with each other in the single coating device.

6. The method of preparing an electrode for a secondary battery according to claim 1,
   wherein a stacking order of the first layer and the second layer is determined by a difference in density between the first slurry and the second slurry.

7. The method of preparing an electrode for a secondary battery according to claim 1,
   wherein the first slurry and the second slurry are respectively injected into the single coating device from separate mixers.

8. The method of preparing an electrode for a secondary battery according to claim 7,
   wherein flow rates per unit time at which the first slurry and the second slurry are injected into the single coating device from the separate mixers are identical to each other.

9. The method of preparing an electrode for a secondary battery according to claim 1, wherein the first slurry and the second slurry are injected together into the single coating device via a single pipe from a single mixer and the interface between the first slurry and the second slurry exists in the single pipe.

10. The method of preparing an electrode for a secondary battery according to claim 1, wherein the method comprises a drying step of simultaneously drying the first layer and the second layer coated onto the current collector.

11. The method of preparing an electrode for a secondary battery according to claim 1, wherein the method comprises a rolling step of simultaneously rolling the first layer and the second layer coated onto the current collector to form a first active material layer and a second active material layer.

* * * * *